(12) United States Patent
Ahn

(10) Patent No.: US 6,252,741 B1
(45) Date of Patent: Jun. 26, 2001

(54) THIN FILM MAGNETIC RECORDING HEAD WITH TREATED CERAMIC SUBSTRATE

(75) Inventor: Junghi Ahn, San Jose, CA (US)

(73) Assignee: Greenleaf Technologies, Saegertown, PA (US)

(*) Notice: Subject to any disclaimer, the term of this patent is extended or adjusted under 35 U.S.C. 154(b) by 0 days.

(21) Appl. No.: 09/309,829

(22) Filed: May 11, 1999

(51) Int. Cl.[7] ................................................. G11B 5/127
(52) U.S. Cl. ................................. 360/235.1; 29/603.07
(58) Field of Search ........................... 360/320, 313, 360/317, 323, 122, 235.2, 235.123, 235.3, 125, 126; 29/603.07, 603.13, 603.14, 603.12; 219/121, 121.12, 121.15; 315/111.81; 427/527

(56) References Cited

U.S. PATENT DOCUMENTS

| | | | |
|---|---|---|---|
| 4,398,079 | 8/1983 | Dard et al. ............................ | 219/121 |
| 4,575,923 | 3/1986 | Arnold .................................. | 29/576 |
| 4,696,829 | 9/1987 | Legg ..................................... | 427/38 |
| 4,774,103 | 9/1988 | Kamigaito et al. ................... | 427/38 |
| 4,831,230 | 5/1989 | Lemelson ......................... | 219/121.12 |
| 4,853,514 | 8/1989 | Lemelson ......................... | 219/121.12 |
| 5,039,836 | 8/1991 | Lemelson ......................... | 219/121.13 |
| 5,064,989 | 11/1991 | Lemelson ......................... | 219/121.12 |
| 5,075,130 | 12/1991 | Reeber et al. ....................... | 427/38 |
| 5,170,032 | 12/1992 | Lemelson ......................... | 219/121.15 |
| 5,231,259 | 7/1993 | Lemelson ......................... | 219/121.12 |
| 5,308,241 | 5/1994 | Lemelson ......................... | 219/121.13 |
| 5,476,691 | 12/1995 | Anders et al. ..................... | 427/527 |
| 5,558,718 | 9/1996 | Leung ............................... | 118/723 E |
| 5,689,478 | * 11/1997 | Ishii et al. .............................. | 369/13 |
| 5,771,141 | * 6/1998 | Ohtsuka et al. ..................... | 360/322 |
| 5,838,522 | 11/1998 | Komvopoulos et al. ............ | 360/122 |
| 5,866,240 | * 2/1999 | Prabhu et al. ....................... | 428/210 |
| 5,882,609 | * 3/1999 | Shiota et al. ..................... | 422/186.07 |
| 5,986,857 | * 11/1999 | Hirano et al. ...................... | 360/320 |
| 5,995,336 | * 11/1999 | Michalek et al. ................... | 360/320 |
| 6,046,890 | * 4/2000 | Yamada et al. ..................... | 360/323 |

FOREIGN PATENT DOCUMENTS 0 680 036 A1  11/1995  (EP).
63-95155  *  4/1988  (JP).

OTHER PUBLICATIONS

Patent Abstracts of Japan vol. 1995, No. 10, Nov. 30, 1995 (relating to Japanese application No. 05316932, filed Dec. 16, 1993).

Patent Abstracts of Japan vol. 1997, No. 4, Apr. 30, 1997 (relating to Japanese application No. 07122881, filed May 22, 1995).

Patent Abstracst of Japan vol. 1995, No. 10, Nov. 30, 1995 (relating to Japanese application No. 05327932, filed Dec. 24, 1993).

Patent Abstracts of Japan vol. 1996, No. 12, Dec. 26, 1996 (relating to Japanese application No. 07007261, filed Jan. 20, 1995).

* cited by examiner

Primary Examiner—David L. Ometz
Assistant Examiner—Tianjie Chen
(74) Attorney, Agent, or Firm—Kirkpatrick & Lockhart LLP (57) ABSTRACT

A method for increasing electrical resistivity of at least a portion of a substrate includes providing a ceramic substrate and carrying out at least one of ion implantation and plasma immersion on the ceramic substrate with ions derived from at least one source selected from the group consisting of noble gases, nitrogen, oxygen, halogens, halogen compounds, silicon, and antimony. The method provides a modified region within the substrate extending from a surface of the substrate into the substrate and having enhanced electrical resistivity. The method can be applied in the production of thin film magnetic recording heads and devices incorporating such heads. The method obviates shortcomings associated with conventional magnetic recording head fabrication techniques.

18 Claims, 11 Drawing Sheets

THIN FILM MAGNETIC RECORDING HEAD WITH TREATED CERAMIC SUBSTRATE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention is directed to a method for enhancing the electrical resistivity of at least a region of a ceramic substrate. The present invention also is directed to a ceramic substrate having a region of enhanced electrical resistivity that is provided by the method of the invention. In addition, the present invention relates to thin film magnetic recording heads having inductive or magnetoresistive sensors and wherein the heads' electronic layers are disposed on a region of substrate of a ceramic material, the region having enhanced electrical resistivity relative to the remainder of the substrate and composed predominantly of the ceramic material. The region of enhanced electrical resistivity may be provided by the method of the present invention.

The method of the invention finds application in any field in which it is desirable to enhance the electrical resistivity of at least a region of a ceramic substrate. An example of a specific application of the present method is in the production of inductive and magnetoresistive (AMR, giant magnetoresistive, or spin valve) thin film magnetic recording heads.

2. Background of Invention

Ceramic materials are commonly used as a substrate in the production of inductive and magnetoresistive thin film magnetic recording heads. One subset of these ceramic materials is composed primarily of alumina ($Al_2O_3$) and titanium carbide (TiC). A particular example of this type of ceramic material, commonly referred to as "AlTiC", includes about 60–80% by weight alumina and about 20–40% by weight titanium carbide, along with the possible intentional addition of other components in minor amounts. AlTiC provides excellent machinablity when subjected to the several shaping processes (slicing, lapping, polishing, etc.) used to form the recording head and its air bearing surface (ABS).

In general, thin film magnetic recording heads are produced as follows. The AlTiC or other ceramic material employed as the substrate in head production is typically provided in a wafer or "puck" form. A series of thin film layers are formed on a surface of the raw wafer, typically using lithography processes comprising one or more steps of seed layer deposition, photoresist, permalloy electroplating, resist stripping, seed layer removal, sputter coating, and removal of metallic and insulating films. The thin film layers formed on the wafer include the magnetic pole elements of the recording head, and the several thin film layers formed on the wafer are referred to collectively herein as the "electronic layer" to contrast that layer with the ceramic substrate material. The ceramic substrate material merely acts to support the electronic layer and does not participate electronically in the read/write process. After the electronic layer is formed on the wafer, the wafer is separated into single rows of devices, called rowbars, by executing spaced parallel cuts through the thickness of the finished wafer. Each rowbar will include a portion of the ceramic wafer and the portion of the electronic layer that has been formed thereon.

The configuration of the magnetic read and write poles within the electronic layer is critical to the proper performance of the head. After each rowbar is sawed from the finished wafer, it is mounted on a transfer tool and the freshly sawed edge of the rowbar is carefully lapped back to adjust the dimensions of the electronic layer. The lapped surface of the electronic layer of the rowbar, with the magnetic pole tips just exposed, becomes the operative end of the head that will fly closest to the rotating magnetic media, on the trailing edge of the magnetic recording head. After the lapping procedure, a number of air bearing surfaces are formed along an exposed ceramic surface of the rowbar. Each rowbar is then sawed into discrete units, each discrete unit including a portion of the ceramic wafer and the portion of the electronic layer formed thereon. Each discrete unit includes magnetic read and write poles and an ABS and is referred to as a magnetic recording head or a "slider". If a magnetic recording head is to be used in a disc drive, it is mounted to a suspension. The combination of the head and the suspension, known as a "head/gimbal assembly", is then incorporated into the hard disc drive. The suspension determines the pitch, roll, normal force, and height of the magnetic recording head relative to the magnetic media. Magnetic recording heads also may be utilized in video or tape devices, in which case they are not mounted to a suspension.

When a magnetic recording head is mounted to a suspension, it is oriented so that the ABS will face the magnetic media when the head/gimbal assembly is assembled into the disc drive. The ABS is designed to allow the magnetic recording head to aerodynamically fly over the magnetic media in microinch proximity as the media rotates, allowing the magnetic poles of the electronic layer to magnetically interact with the magnetic media. The suspension positions the magnetic recording head over the magnetic media so that the electronic layer is at a trailing edge of the magnetic recording head relative to the surface of the rotating magnetic media. The distance between a magnetic pole at the trailing edge of the magnetic recording head and the surface of the rotating magnetic media is referred to as the "flying height". In general, lessening the flying height increases the performance of the head.

The ceramic material from which the wafer is composed must have an electrical resistivity that is low enough to allow dissipation of static electricity accumulation during read/write performance. Wafers composed of ceramic materials having sufficiently low electrical resistivity, such as AlTiC wafers, are too conductive to allow the electronic layer to be built directly on the surface of the ceramic material. Therefore, in the production of magnetic recording heads using AlTiC as the wafer material, a thick (3–10 $\mu$m) electrically insulating layer of alumina (typically amorphous alumina) is formed intermediate the ceramic wafer and the electronic layer. The electrically insulating layer is commonly referred to as an "undercoat" layer or "basecoat", and it must be deposited on a surface of the ceramic wafer before the electronic layer is formed. The process of undercoat formation is very costly. For example, the process of forming an alumina undercoat layer on an AlTiC wafer requires the use of a clean room and costly sputtering equipment, and the proper loading of the wafers into the sputtering apparatus is both time-consuming and critical to the process. During the sputtering process, the ceramic wafer is placed on a water cooled fixture. To effectively cool the wafer, indium-gallium liquid is manually applied between the wafer and water cooled fixture to establish intimate thermal contact. The indium-gallium liquid must be manually wiped off when the coating process is complete. The process of applying and removing the indium-gallium liquid is time-consuming, and any residue left on the wafer surface is a source of contamination for subsequent processes. After the undercoat layer has been deposited, the entire undercoat surface must be planarized, typically by lapping or chemical-mechanical polishing. The undercoat layer also must be adjusted to a specified thickness, surface roughness, and flatness before the undercoat layer's exposed surface receives the build up of the electronic layer thereon. The entire undercoat layer deposition process may take as long as 10 hours, depending on the thickness requirement.

Figure 1:
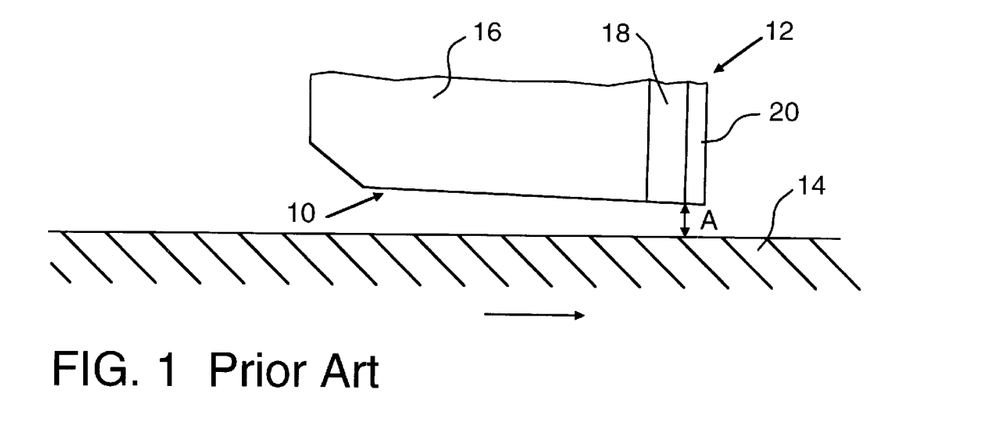
FIG. 1 is a representation of a portion of a conventional magnetic recording head shown in position over a rotating magnetic medium.
Figure 2:
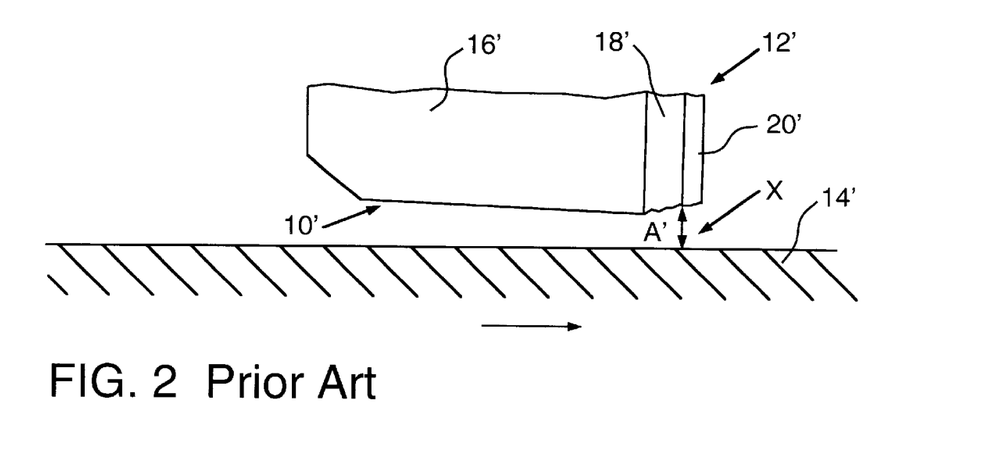
FIG. 2 is a representation of a portion of a conventional magnetic recording head shown in position over a rotating magnetic medium and further showing increased flying height resulting from preferential erosion of the alumina undercoat and electronic layers.

FIG. 1 is a representation of a portion of a conventional magnetic recording head and shows the position of the head relative to the rotating magnetic media during read/write performance. The ABS 10 of the magnetic recording head 12 opposes the magnetic medium 14. The magnetic recording head 12 includes a AlTiC ceramic substrate 16, an alumina undercoat layer 18 disposed on the substrate 16, and an electronic layer 20 disposed on the undercoat layer 18. The arrow indicates the direction of movement of the magnetic medium 14 relative to the head. Thus, the electronic layer 20 is disposed on the trailing edge of the head 12. The general position at which the flying height of the magnetic recording head 12 above the magnetic medium 14 is measured is indicated as "A". The alumina undercoat layer 18, which typically is sputter deposited, is soft relative to the ceramic substrate material 16. For example, the measured hardness of an alumina undercoat layer is typically about half that of an AlTiC substrate. Therefore, during ABS and pole tip lapping, the alumina undercoat 18 and the overlying electronic layer 20, which includes the magnetic read and write poles, are worn away to a greater extent than the ceramic substrate 16. FIG. 2 depicts a magnetic recording head 12' having ABS 10', alumina undercoat layer 18', and electronic layer 20'. The magnetic recording head 12' is disposed above a rotating magnetic medium 14'. Preferential erosion of the undercoat layer 18' and the electronic layer 20' relative to the ABS 10' has occurred during ABS and pole tip lapping in the region generally indicated by "X". The preferential erosion of the magnetic poles relative to the substrate during ABS and pole tip lapping increases the vertical displacement between the surface of the ABS and the tips of the magnetic read and write poles, which is defined as the "pole tip recession". It follows that the flying height increases as the extent of pole tip recession increases. For example, the flying height A' of the magnetic recording head 12' of FIG. 2 is greater relative to that of head 12 of FIG. 1 by the extent of pole tip recession.

With flying heights now approaching near-contact levels, any increase in the pole tip recession may represent a significant fraction of the total distance between the recording head and the magnetic media. Thus, to ensure improved performance of the head, the extent of pole tip recession must be minimized. If the pole tips are too greatly recessed relative to the ABS, this may cause a degradation or a complete lack of signal. There is a desired minimum amount of pole tip recession that will cause the least loss of magnetic signal and also ensure that the magnetic poles will not contact the magnetic media. To determine whether pole tip recession is within the acceptable range, it is currently industry practice to inspect every magnetic recording head after ABS and pole tip lapping. This inspection process adds significant cost to the finished magnetic recording head, and a portion of the heads are discarded on failing inspection.

An additional problem inherent in using an alumina undercoat is that there is a difference between the thermal expansion coefficients of the alumina undercoat and of the AlTiC substrate. Moreover, the alumina undercoat retains a degree of internal residual stress upon application to the substrate. The combination of the undercoat's residual stress and the difference in thermal expansion results in warping of the undercoated wafer during the elevated temperature (typically 200–250° C.) processes used to build up the electronic layer. As the magnetic recording head industry pushes for increased wafer diameter (currently moving from 4 inches to 6 inches, and even as great as 8 inches) and reduced wafer thickness (currently moving from 0.080 inches to 0.052 inches, and as thin as 0.030 inches), the degree to which alumina undercoated AlTiC wafers warp will become progressively worse. Rowbars sawed from warped wafers will be curled or bowed. If this bowing becomes excessive, it is difficult or impossible to perform pole tip lapping on the rowbar transfer tool. Magnetic recording heads cut from an excessively warped alumina undercoated wafer may have excessive and unacceptable geometric distortions. These distortions are commonly referred to as twist, camber, and crown.

Accordingly, a need exists for a method of producing magnetic recording heads in which the potential for pole tip recession is reduced and, consequently, the time and cost involved in producing the heads also is reduced. In addition, a need exists for a method of producing thin film magnetic recording heads that will not result in warping of undercoated wafers on build up of the electronic layer, and will not result in bowing of rowbars sawed from such undercoated wafers, thus reducing the extent of any twist, camber, or crown.

SUMMARY OF THE INVENTION

The present invention is directed to a method for increasing the electrical resistivity of at least a portion of a substrate. The method includes providing a ceramic substrate and carrying out one or both of ion implantation and plasma immersion on at least a portion of the ceramic substrate with ions derived from at least one ion source selected from the group consisting of noble gases, nitrogen, oxygen, halogens, halogen compounds, silicon, and antimony. The ion implantation and/or plasma immersion treatment provides a modified region extending into the ceramic substrate and having an electrical resistivity, as measured at the substrate surface, that is enhanced relative to the remaining, unmodified portion of the substrate.

The present invention may be adapted to, for example, processes for constructing thin film magnetic recording heads. In such case, a suitable ceramic substrate is provided and one or both of ion implantation and plasma immersion is carried out on the ceramic substrate to provide a region of suitably enhanced electrical resistivity. An electronic layer comprising at least one magnetic pole is formed on at least a portion of the region of enhanced electrical resistivity. The region electrically insulates the electronic layer from the ceramic substrate.

The method of the present invention may be used to provide all or a portion of a ceramic substrate with an extremely thin (approximately 100–1000 Å) layer of increased electrical resistivity. The electrically resistive region produced by the present method is an integral part of the substrate, and it may be extremely thin (as thin as about 100 Å). The present inventor has shown that the method of the present invention may be adapted to increase the electrical resistivity of a surface of the ceramic substrate by at least seven orders of magnitude, and increases in electrical resistivity of fourteen orders of magnitude have been achieved by the method of the invention. By applying the method of the present invention, the conventional method for enhancing the electrical resistivity of a ceramic wafer during the production of thin film magnetic recording heads, comprising sputter coating an approximately 3–10 μm layer of alumina on the ceramic wafer and then lapping the layer surface, may be entirely avoided.

Because the electrically resistive region produced by the present method is an integral part of the substrate, the present method eliminates the preferential erosion problem, discussed above, that is a consequence of the conventional alumina undercoat formation technique used in thin film magnetic recording head production. Moreover, because the original thickness, planarity, and surface roughness of the ceramic wafer is not affected by the method of the present invention, additional surface finishing is unnecessary after the electrically resistive region is formed.

It will be apparent that the method of the present invention will reduce the costs associated with conventional thin film magnetic recording head production techniques. The present invention's method will lessen the number of rejected heads and will reduce or eliminate the necessity to inspect finished heads for acceptable levels of pole tip recession, twist, camber, and crown. The present invention's method also does not require use of sputtering equipment and the associated facility and personnel costs. It is noted that treating ceramic wafers by ion implantation or plasma immersion is significantly less costly than sputter coating and lapping the wafers.

The reader will appreciate the foregoing details and advantages of the present invention, as well as others, upon consideration of the following detailed description of embodiments of the invention. The reader also may comprehend such additional details and advantages of the present invention upon using the invention.

BRIEF DESCRIPTION OF THE DRAWINGS

The features and advantages of the present invention may be better understood by reference to the accompanying drawings in which like reference numerals refer to like elements and in which.

DETAILED DESCRIPTION OF THE INVENTION

While the methods and articles of the present invention are susceptible of embodiment in many different forms, the present detailed description of the invention discloses only specific forms as examples of the invention. The invention, however, is not limited to the embodiments so described, and the scope of the invention is better described in the appended claims. In particular, although the methods of the present invention are principally described in connection with the production of thin film magnetic recording heads, it will be apparent to one of ordinary skill in the art familiar with the present description of the invention that the method of the present invention may be applied in any other application wherein it is desirable to increase the electrical resistivity of at least a portion of an article comprising ceramic material. Although such other applications are not fully described herein, it will be understood that they may be encompassed by one or more of the appended claims.

The method of the present invention includes subjecting at least a surface of a wafer, puck, or other article comprising a ceramic material to energized ions in order to modify at least a region extending into the wafer, puck, or other article to thereby increase the electrical resistivity of the region. Such region naturally will include at least a portion of the surface of the wafer, puck or other article. The method may be carried out by either of the techniques of ion implantation or plasma immersion. Ion implantation is a line-of-sight treatment technique wherein a beam of energetic ions extracted from a plasma source is accelerated toward a surface of a solid to be implanted. The ions bombarding the surface of the solid at high energy become buried within the subsurface region of the solid, resulting in the modification of the atomic composition and lattice structure of the subsurface region without affecting surface roughness, dimensional properties, and bulk material properties. Plasma immersion is a non-line-of-sight technique in which the solid target is immersed in a plasma and repetitively pulse-biased to a high negative voltage relative to the plasma potential. A plasma sheath forms around the solids, and ions accelerate through the electric field of the sheath, bombarding all exposed and unprotected surfaces of the solid simultaneously with ions. Accordingly, both techniques are essentially identical in that ions generated from a source are accelerated and caused to bombard one or more surfaces of a solid and are implanted within the solid's subsurface region.

The ion implantation and plasma immersion techniques that may be used in the method of the present invention may be carried out in a conventional manner, respecting the ion identity, dosage, and energy parameters of the present method which are described below. Both ion implantation and plasma immersion are well known processes, and one of ordinary skill in the art, having considered the present description of the invention, will be fully capable of carrying out either of the techniques in connection with the present method without undue experimentation. Accordingly, a detailed description of the ion implantation and plasma immersion techniques is not provided herein.

When applied in the production of thin film magnetic recording heads, the method of the present invention replaces the steps of undercoat formation and planarization. Thus, after the present method has been carried out on a region of the ceramic wafer from which the heads are produced, the electronic layer, which includes the one or more magnetic poles, may be built up directly on the exposed surface of the region of the wafer treated by the method of the present invention.

Ceramic materials that may be provided with enhanced electrical resistivity by the method of the present invention include those incorporating any carbide material. Examples of such carbide materials include silicon carbide, titanium carbide, and boron carbide. The identities of other carbide materials incorporated into ceramic materials will be readily apparent to those having ordinary skill in the art. The ceramic materials to which the present invention may be applied also include those ceramic materials used as substrates in the production of thin film magnetic recording heads including, for example, AlTiC. Ions that may be employed in the ion implantation and plasma immersion techniques of the present method include ions derived from any of the noble gases (helium, neon, argon, krypton, and xenon), nitrogen, oxygen, the halogens (fluorine, chlorine, bromine, and iodine), compounds of the halogens, silicon, and antimony. It is believed that ions of one or a combination of the forgoing ion sources may be utilized in the present method. Halogen compounds from which ions useful in the present method may be derived include, for example, fluorosilane ($SiF_4$) and $BF_3$. Examples of ions derived from $SiF_4$ that may be used in the present invention's method include $SiF_3^+$, $SiF_2^+$, $SiF^+$, $Si^+$, $F^+$, and $Si^{2+}$. Bombarding the substrate with the energized ions causes at least a portion of the ions to enter into the substrate, and this provides a modified region within the substrate that is physically and/or chemically modified relative to the remainder of the substrate. The modifications are believed to provide the enhanced electrical resistivity.

The ion implantation and plasma immersion techniques that may be used in the method of the invention may be further characterized by the ion dosage and energy ranges found to be effective to enhance the electrical resistivity of a surface of a ceramic substrate to a level that will sufficiently electrically insulate the electronic layer of a thin film magnetic recording head from the head's ceramic substrate. It is believed that an ion dosage in the range of about $10^{14}$ to about $10^{18}$ ions/$cm^2$ will provide sufficient electrical resistivity to sufficiently insulate the electronic layer from the ceramic substrate. An ion dosage in the range of about $10^{15}$ to about $10^{17}$ ions/$cm^2$ is preferred to obtain sufficient electrical resistivity enhancement with reasonable cost considerations. Ion energies in the range of about 1 to about 150 KeV are believed to provide sufficient electrical resistivity, and energies in the range of about 10 to about 75 KeV are preferred. It will be understood that the actual effects of the implantation and immersion techniques applied in the present method will depend on the particular combination of treatment parameters (including ion source, dosage, and energy), and one of ordinary skill in the surface treatment arts may, without undue experimentation, determine combinations of such parameters that will adequately enhance the electrical resistivity of the treated surface.

Magnetic recording heads produced using the method of the present invention need not include an alumina undercoat layer. Instead, magnetic recording heads produced using the method of the present invention may include a modified region that is an integral part of the ceramic substrate but has electrical resistivity that is significantly enhanced relative to the remaining, unmodified regions of the ceramic substrate. This may be contrasted with a thin film magnetic recording head of a conventional construction. Such conventional thin film magnetic recording heads include a separately formed alumina undercoat layer (i.e., the undercoat layer is not an integral part of the substrate).

Figure 3:
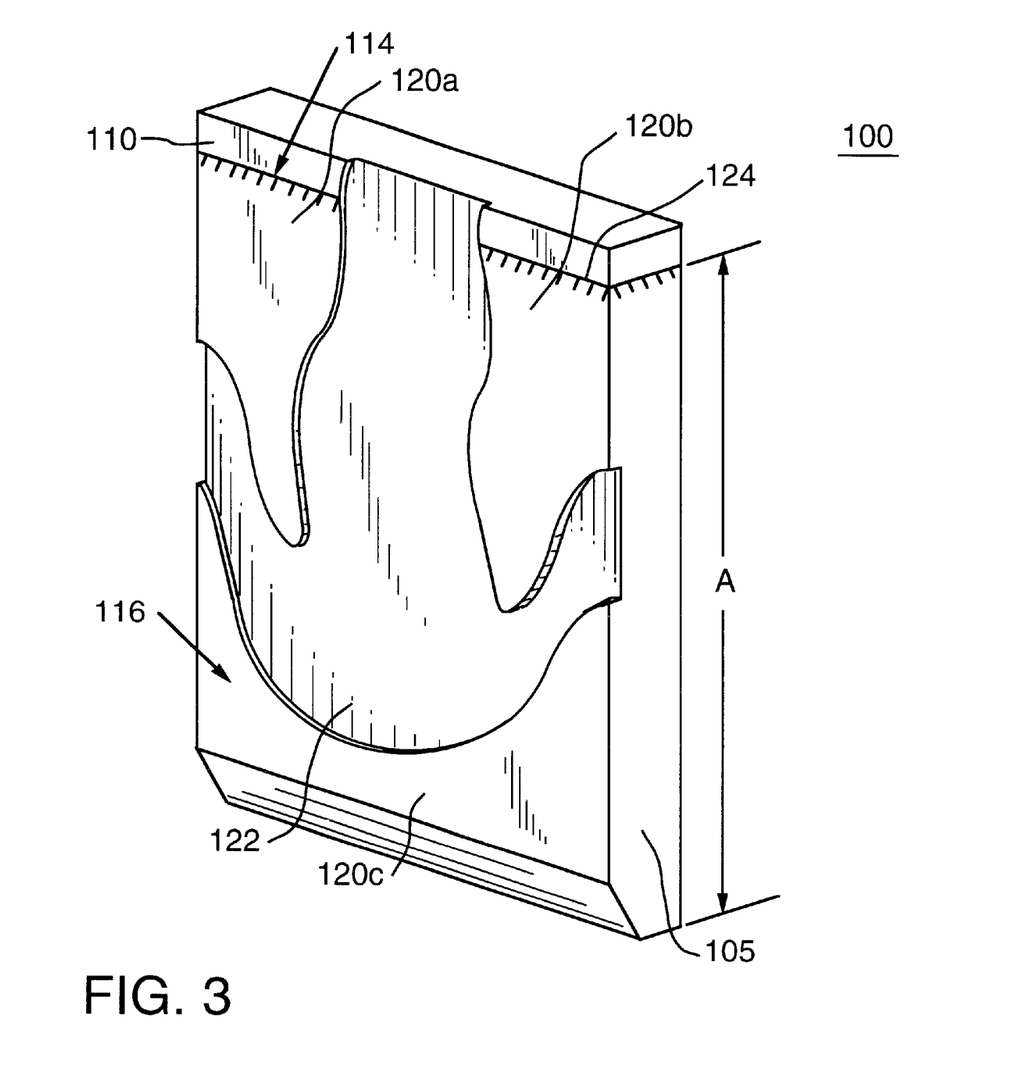
FIG. 3 is a representation of a magnetic recording head constructed according to the method of the present invention.

Turning now to the figures, FIG. 3 depicts a thin film magnetic recording head 100 fabricated using the method of the present invention. The magnetic recording head 100 includes a ceramic substrate portion 105 and an electronic layer 110. The electronic layer 110 includes magnetic read and write poles (not shown) formed by lithography techniques on a surface of the ceramic wafer (the position of the original wafer surface within the head is indicated by 114). Thus, it will be understood that the original thickness of the ceramic wafer is represented by the dimension "A". The magnetic recording head 100 will be attached to a suspension to provide a head/gimbal assembly, and the orientation of the head 100 will be such that the ABS regions 120a, 120b, and 120c face the rotating magnetic media. The ABS regions 120a, 120b, and 120c have been defined by forming a recess 122 in the ceramic substrate portion 105 by ion milling or reactive ion etching a portion of the surface 116 of the ceramic substrate portion 105 as well as a portion of the electronic layer 110. The shape of the ABS is proprietary to each head manufacturer. The ABS shown in FIG. 3 is for the purpose of illustration only and is in no way intended to limit the scope of the invention.

A thin film magnetic recording head produced by a conventional technique would include an electrically insulating undercoat layer, typically 3 $\mu$m to 10 $\mu$m of alumina, intermediate the head's electronic layer and ceramic substrate portion. In contrast. the ceramic substrate portion 105 of the magnetic recording head 100 of the invention, shown in FIG. 3, includes a modified region, generally indicated as hatched region 124, having a significantly enhanced electrical resistivity relative to the electrical resistivity of the remainder of the ceramic substrate portion 105. The region 124 has been provided by subjecting a surface of the ceramic wafer to the method of the present invention. The method was applied to the ceramic wafer prior to the succeeding steps of electronic layer formation, sectioning into rowbars, ABS and pole tip lapping, ABS formation, and separation into individual magnetic recording heads. The thickness of the region 124 in FIG. 3 has been emphasized to indicate its position; in practice it may be no thicker than about 100 Å. The region 124 electrically insulates the electronic layer 110 of the magnetic recording head 100 from the ceramic substrate portion 105. Providing the electrically resistive region 124 by the method of the invention obviates the need for an alumina undercoat layer and the step of planarizing the undercoat layer and, consequently, eliminates excessive pole tip recession during ABS and pole tip lapping.

Magnetic recording heads produced using the method of the present invention may be incorporated into magnetic memory devices (i.e., magnetic data storage and retrieval devices such as, for example, hard disk drives) as a component of a head/gimbal assembly. Such magnetic memory devices, in turn, may be incorporated into electronic devices. As used herein, an "electronic device" is any device that includes a data storage device incorporating a magnetic recording head produced using the method of the present invention irrespective of whether the head is mounted on a suspension. Examples of such electronic devices include computers (desktop, laptop, hand held, etc.), video players and recorders, digital cameras, and cellular phones.

Accordingly, the present invention also is directed to magnetic memory devices including heads produced by the method of the invention and electronic devices as herein defined.

To illustrate the present invention's advantages, AlTiC wafers 125 mm in diameter and 1.2 or 2.0 mm thick were treated by the method of the invention using ion implantation, ions derived from various sources, and various ion dosages and energies. A Varian XP Series 120-10 implanter was used to ion implant each of the wafers. The manner of operating such an implanter is known to those having ordinary skill in the substrate treatment arts and, therefore, is not described herein. The wafers were of GS-1 material obtained from Greenleaf Corporation, Saegertown, Pa. The intended use of GS-1 material is as the ceramic substrate material for thin film magnetic recording heads. GS-1 material is identical in composition to material commonly used as thin film magnetic recording head substrate material. Raw GS-1 has the following properties and composition:

| | |
|---|---|
| Density | 4.25 g/cc |
| Hardness | 1954 Hv |
| Electrical Resistivity | 0.008 ohm-cm |
| Bending strength | 835 MPa |
| Young's Modulus | $386 \times 10^3$ MPa |
| Fracture Toughness | 4.6 MPa/$\sqrt{m}$ |
| Thermal Expansion | 7.5 ppm/° C. |
| Thermal Conductivity | 17.4 W/m° k |
| Average Grain Size | 0.9 $\mu$m |
| Optical Index ($\lambda$ = 546 nm) | n = 2.204, k = 0.402 |
| Composition | |
| $Al_2O_3$ | 66 weight % |
| TiC | 30 weight % |
| $ZrO_2$ | 4.0 weight % |
| MgO | <0.3 weight % |

Table 1 lists several experimental runs and sets out the parameters used for the ion implantation in each run, including the source from which the implanting ions were derived, the ion dosage, and the ion energy. The electrical resistivity of the treated wafer surface after ion implantation is noted. Electrical resistivities were determined using a mercury probe device, which employs a capillary of mercury to make substantially perfect electrical contact with the wafer surface. The electrical resistivity measurements assumed that the ion implantations produced, on an average, a layer of increased electrical resistivity within each treated wafer that is effectively 100 Å thick. The accuracy of that assumption was confirmed through other analyses performed on the treated wafers. The electrical resistivity values reported in Table 1 are an average of resistivity measurements taken at several points on each treated wafer.

Fabricating the electronic layer of thin film magnetic recording heads involves several thin film processing steps that occur at elevated temperatures, typically in the range of 200–250° C. Thus, it is essential that the enhanced electrical resistivities provided by the method be retained and not annealed out of the treated wafers at the elevated processing temperatures. To assess whether the increase in electrical resistivity provided by the method of the invention is retained after the wafers are subjected to elevated temperature, treated wafers listed in Table 1 were subjected to an elevated temperature treatment and allowed to cool to room temperature. The post-heat treatment electrical resistivity of the treated surface was then tested again using the mercury probe device. In a first heat treatment, referred to as "HT1" in Table 1, the treated wafer was baked in air at 260° C. for 2 hours and then cooled to room temperature. In a second heat treatment, referred to as "HT2" in Table 1, the treated wafer was flash heated under a quartz lamp for ten seconds in air and then cooled to room temperature. A thermocouple placed on the wafer surface indicated a steady state temperature of 600° C. The post-heat treatment electrical resistivity of each tested wafer is noted in Table 1.

TABLE 1

| Run # | Ion Source | Ion Dosage (ions/cm$^2$) | Ion Energy (KeV) | Resistivity of Treated Surface (ohm-cm) | Heat Treatment | Post-Heat Treatment Resistivity of Treated Surface (ohm-cm) | Notes |
|---|---|---|---|---|---|---|---|
| 1 | Boron | $1 \times 10^{16}$ | 50 | $6.0 \times 10^4$ | — | — | |
| 2 | Nitrogen | $1 \times 10^{16}$ | 50 | $2.9 \times 10^5$ | HT1 | $9.6 \times 10^6$ | |
| 3 | Silicon | $1 \times 10^{16}$ | 50 | $1.5 \times 10^6$ | HT1 | $2.0 \times 10^7$ | a |
| 4 | Oxygen | $1 \times 10^{16}$ | 50 | $6.3 \times 10^5$ | HT1 | $1.6 \times 10^7$ | |
| 5 | Silicon | $1 \times 10^{16}$ | 50 | $1.1 \times 10^6$ | HT1 | $2.1 \times 10^7$ | b |
| 6 | Argon | $1 \times 10^{16}$ | 50 | $5.0 \times 10^5$ | HT1 | $5.4 \times 10^7$ | |
| 7 | $BF_3$ | $1 \times 10^{16}$ | 50 | $1.0 \times 10^6$ | HT1 | $5.6 \times 10^7$ | c |
| 8 | $SiF_4$ | $1 \times 10^{16}$ | 50 | $9.6 \times 10^5$ | HT1 | $1.7 \times 10^{10}$ | d |
| 9 | Silicon | $1 \times 10^{16}$ | 50 | $1.3 \times 10^6$ | HT1 | $4.7 \times 10^7$ | e |
| 10 | Antimony | $1 \times 10^{16}$ | 50 | $3.5 \times 10^6$ | HT1 | $8.7 \times 10^5$ | |
| 11 | Antimony | $5 \times 10^{15}$ | 12.5 | $2.8 \times 10^7$ | HT1 | $1.7 \times 10^6$ | |
| 12 | $SiF_4$ | $5 \times 10^{15}$ | 50 | — | HT1 | $8.5 \times 10^{11}$ | d |
| 13 | $SiF_4$ | $2 \times 10^{16}$ | 12.5 | — | HT1 | $1.1 \times 10^9$ | d |
| 14 | $SiF_4$ | $5 \times 10^{15}$ | 75 | — | HT1 | $7.8 \times 10^9$ | d |
| 15 | $SiF_4$ | $2 \times 10^{16}$ | 12.5 | $1.9 \times 10^{10}$ | — | — | d |
| 16 | $SiF_4$ | $4 \times 10^{16}$ | 12.5 | $2.5 \times 10^{10}$ | — | — | d |
| 17 | $SiF_4$ | $2 \times 10^{16}$ | 12.5 | $7.3 \times 10^9$ | — | — | d,f |
| 18 | $SiF_4$ | $4 \times 10^{16}$ | 12.5 | $1.1 \times 10^{11}$ | — | — | d,f |
| 19 | $SiF_4$ | $4 \times 10^{16}$ | 12.5 | — | HT2 | $3.3 \times 10^{10}$ | d,f | a Ions derived from source were singly charged.
b Ions derived from source were diatomic silicon ions.
c Ions derived from source were predominantly $BF_2^+$.
d Ions derived from source were predominantly $SiF_3^+$.
e Ions derived from source were doubly charged.
f Ten wafers were implanted under these conditions, and the electrical resistivity is an average for the ten treated wafers The data in Table 1 show that the method of the present invention greatly enhances the electrical resistivity measured at the surface of ceramic wafers. The increase in resistivity from the 0.008 ohm-cm value for raw GS-1 material was at least about seven orders of magnitude, and increases as high as fourteen orders of magnitude were achieved. Each of the ion species used for the ion implantation provided greatly enhanced electrical resistivity, and electrical resistivities adequate to electrically insulate the electronic layer of a thin film magnetic recording head from the conductive portion of the ceramic substrate were realized. Ions species derived from fluorosilane ($SiF_4$) provided particularly high electrical resistivities at each tested combination of ion dosage and energy. The ion implantation procedure also was not observed to change the dimensions of the wafer or affect the planarity or roughness of the implanted wafer surface.

The heat treatment experiments showed that wafers treated by the method of the invention retain enhanced resistivity after being subjected to the elevated temperatures indicated. It is noted that the conditions under which the wafers were heat treated are at least as severe as the conditions to which wafers would be subjected during build up of the electronic layer. Each heat treated wafer retained electrical resistivity sufficiently high for thin film magnetic recording head production. In fact, heat treatment actually increased the electrical resistivity of wafers implanted in runs 2–9. The electrical resistivity of the wafers implanted with ions derived from antimony slightly decreased, but remained at least about $8 \times 10^5$ ohm-cm.

To determine the nature of any chemical or physical changes imparted to GS-1 wafers implanted by the method of the present invention, investigations were undertaken to characterize the composition and chemistry of treated wafers of the GS-1 material as a function of depth following implantation with $SiF_3^+$ ions derived from $SiF_4$. More specifically, secondary ion mass spectrometery (SIMS) and X-ray photoelectron spectroscopy/electron spectroscope chemical analysis (XPS/ESCA) techniques were used to examine a wafer implanted in run 18 of Table 1. XPS/ESCA also was used to examine a wafer implanted and heat-treated in run 19 of Table 1. The wafers of runs 18 and 19 were ion implanted under identical conditions ($SiF_4$ source, $4 \times 10^{16}$ ions/cm$^2$, 12.5 KeV), and the run 19 wafer subsequently received a 10 second, 600° C. heat treatment. It is noted that the results of the SIMS and XPS/ESCA analyses of the wafers of runs 18 and 19 were identical.

Figure 4:
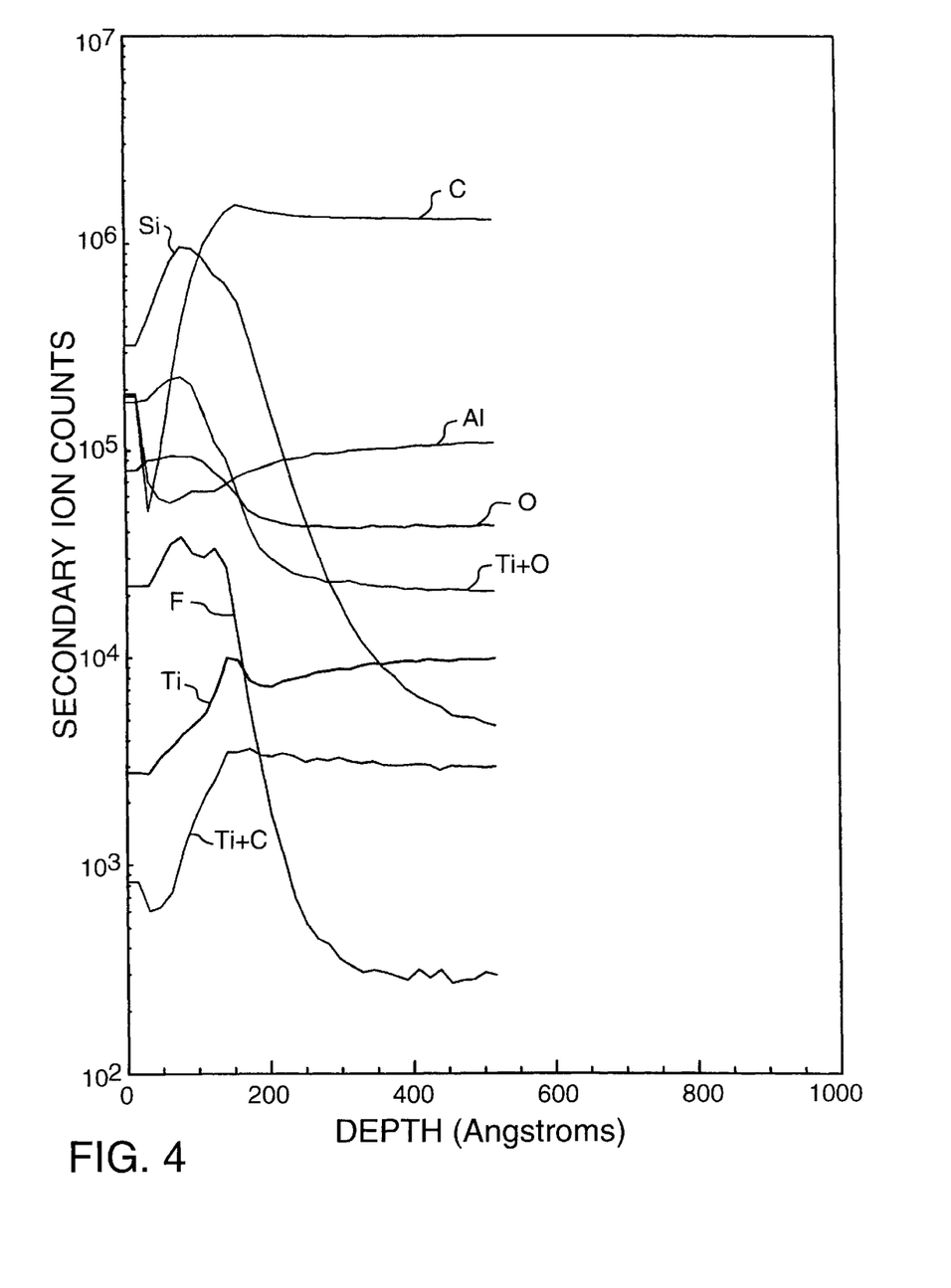
FIG. 4 is a plot of relative ion signal for several chemical species versus depth into the surface of a ceramic wafer treated by the method of the present invention using fluorosilane as the ion source.
Figure 5:
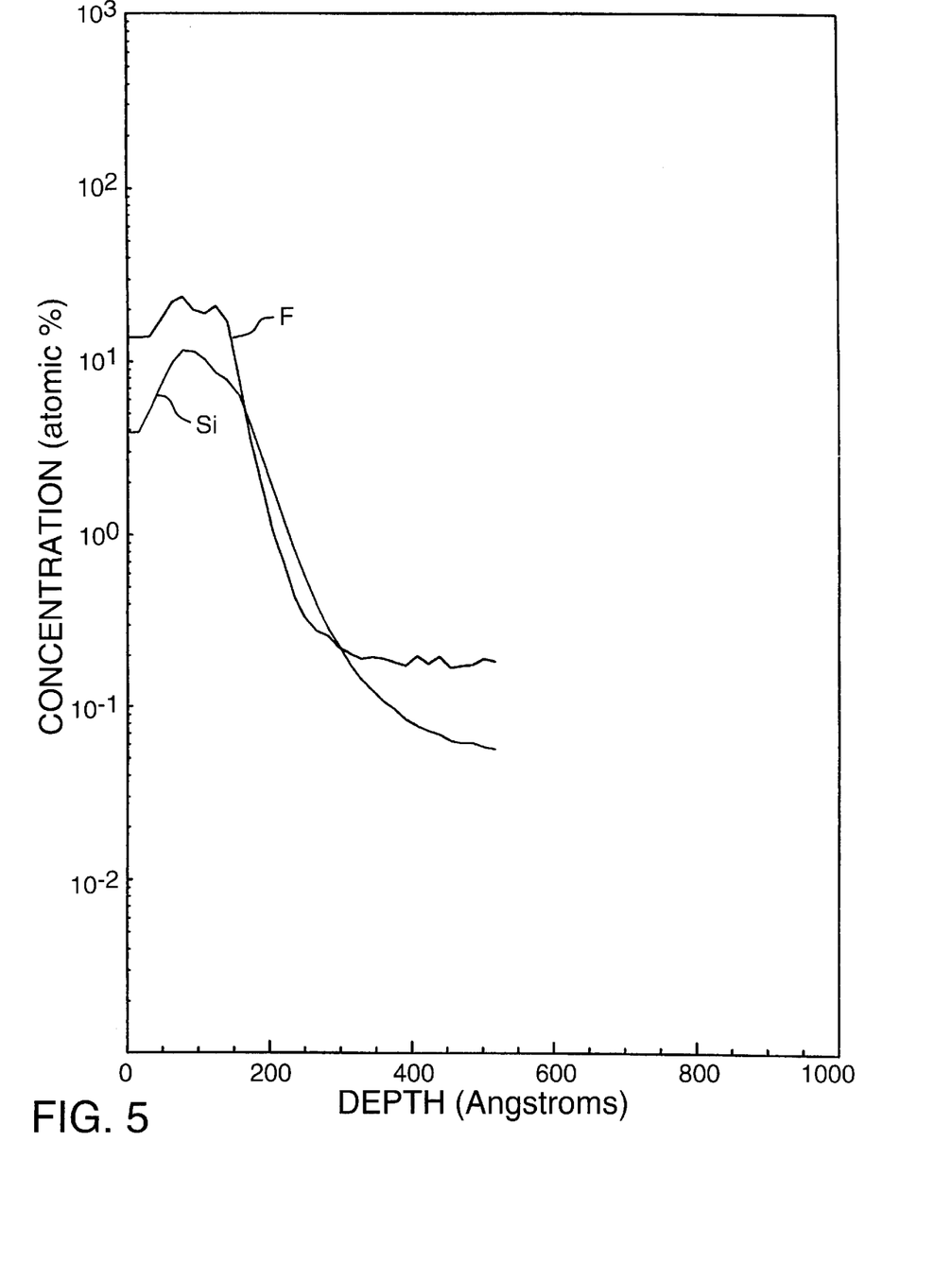
FIG. 5 is a plot of silicon and fluorine atomic concentration versus depth into the surface of a ceramic wafer treated by the method of the present invention using fluorosilane as the ion source.

A PHI 6700 quadrupole mass spectrometer was used in the SIMS technique to profile fluorine and silicon distribution in the vicinity of the treated surface of the run 18 wafer. In addition, aluminum, titanium, carbon, and oxygen were monitored to represent the titanium carbide (TiC) and alumina ($Al_2O_3$) matrix. Molecular combinations of Ti+O and Ti+C also were monitored. FIG. 4 is a plot showing the relative ion signals for all of the foregoing species versus depth into the run 18 wafer. FIG. 5 is a plot of silicon and fluorine atomic concentration versus depth. Zero depth represents the surface of the wafer that was bombarded with $SiF_3^+$ ions by the present method. The atomic C signal indicates carbon depletion in the top 100 Å. The Ti+C curve also suggests carbon depletion near the surface. The O and Ti+O curves suggest the possibility of a surface oxide in place of the TiC state. The Si and F curves show two distinct peaks rather than a single smooth implant distribution. One of the peaks appears in a region identified as the surface oxide region. The other peek is deeper and appears to be beyond the depth of the surface oxide and within the AlTiC substrate material.

Figure 6:
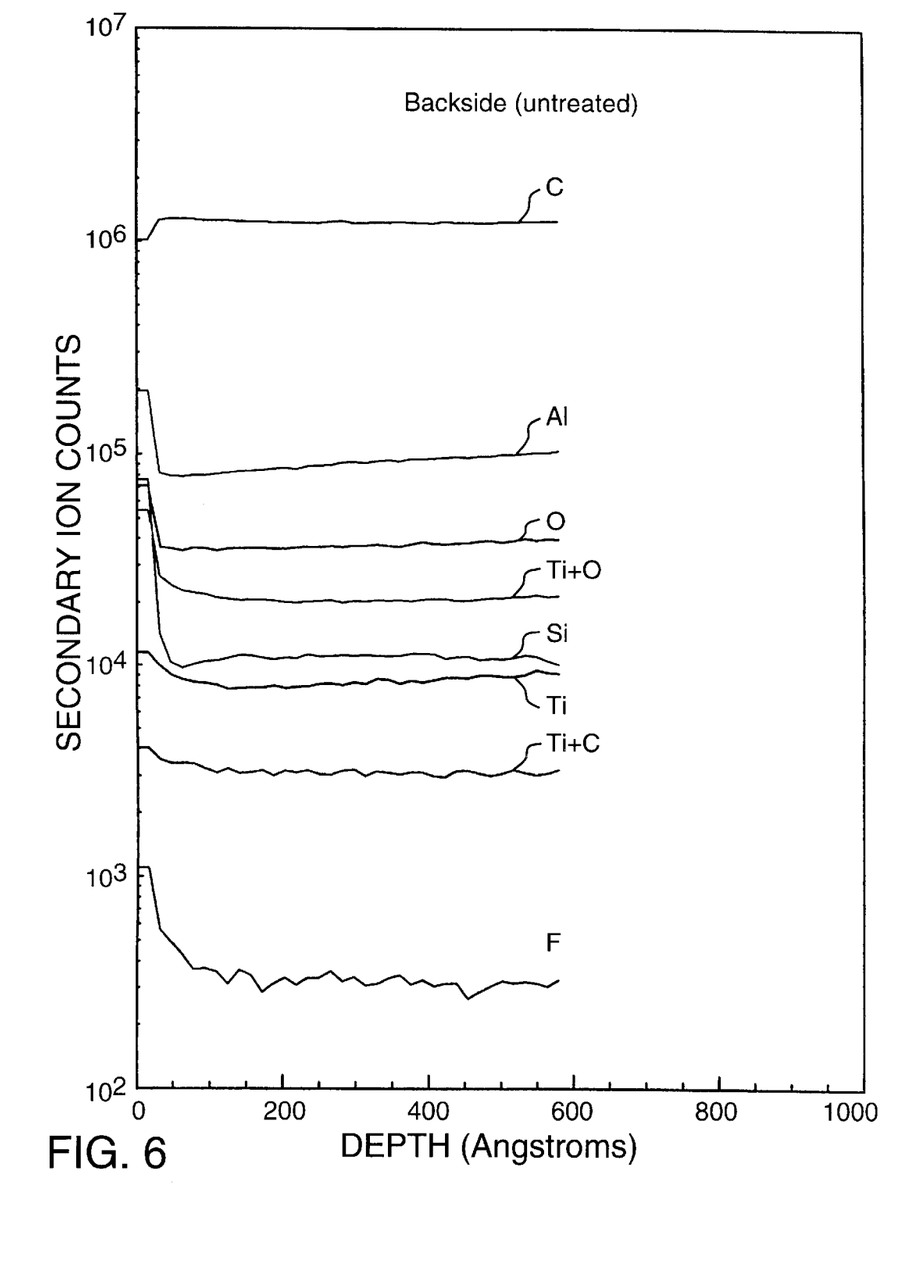
FIG. 6 is a plot of relative ion signal for several chemical species versus depth into the untreated reverse surface of the ceramic wafer that is the subject of FIGS. 4 and 5.
Figure 7:
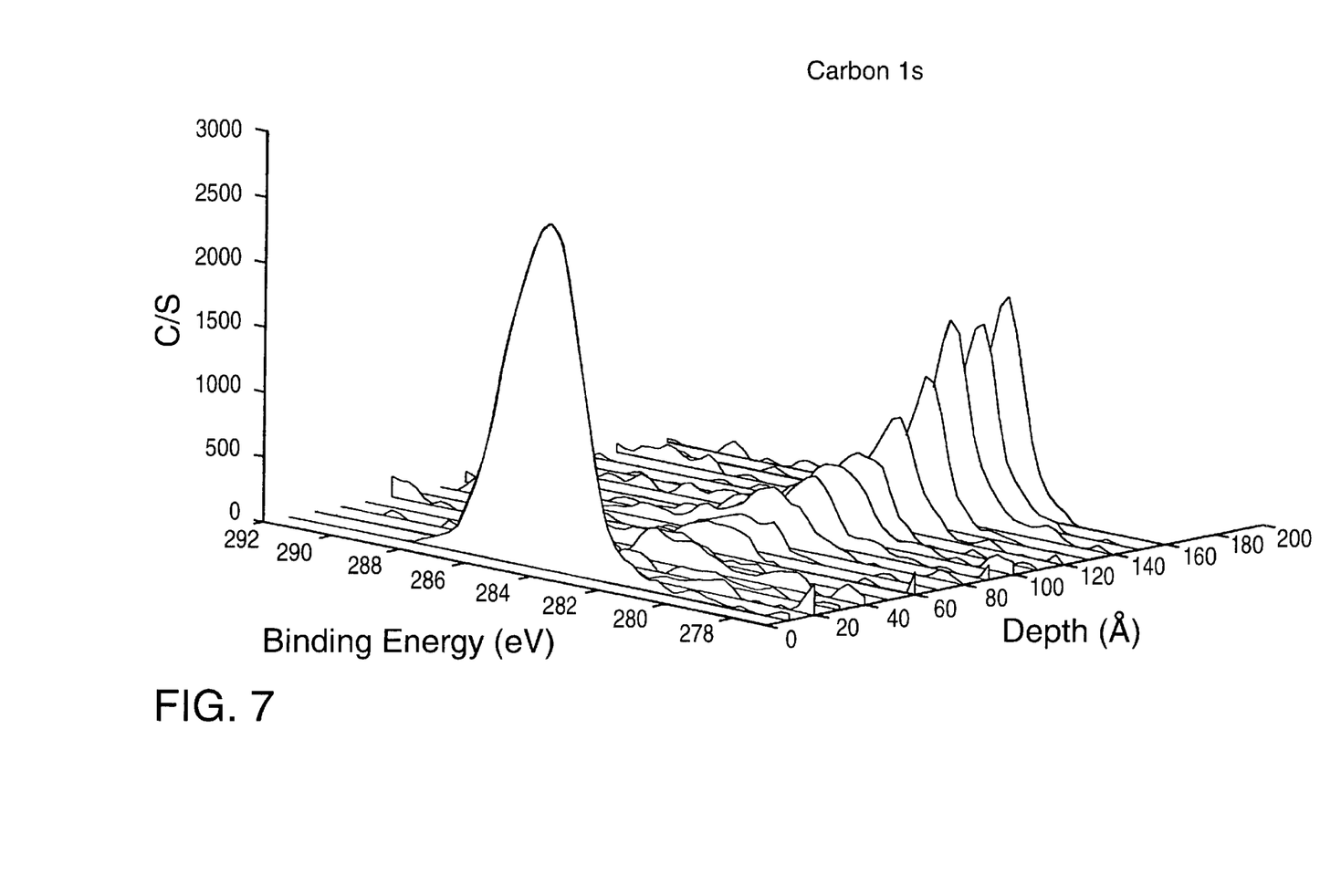
FIG. 7 is a montage plot of carbon concentration versus binding energy as a function of depth within an AlTiC wafer ion implanted by the method of the present invention using a $SiF_4$ ion source, an ion dosage of $4 \times 10^6$ ions/cm$^2$, and an ion energy of 12.5 KeV.
Figure 8:
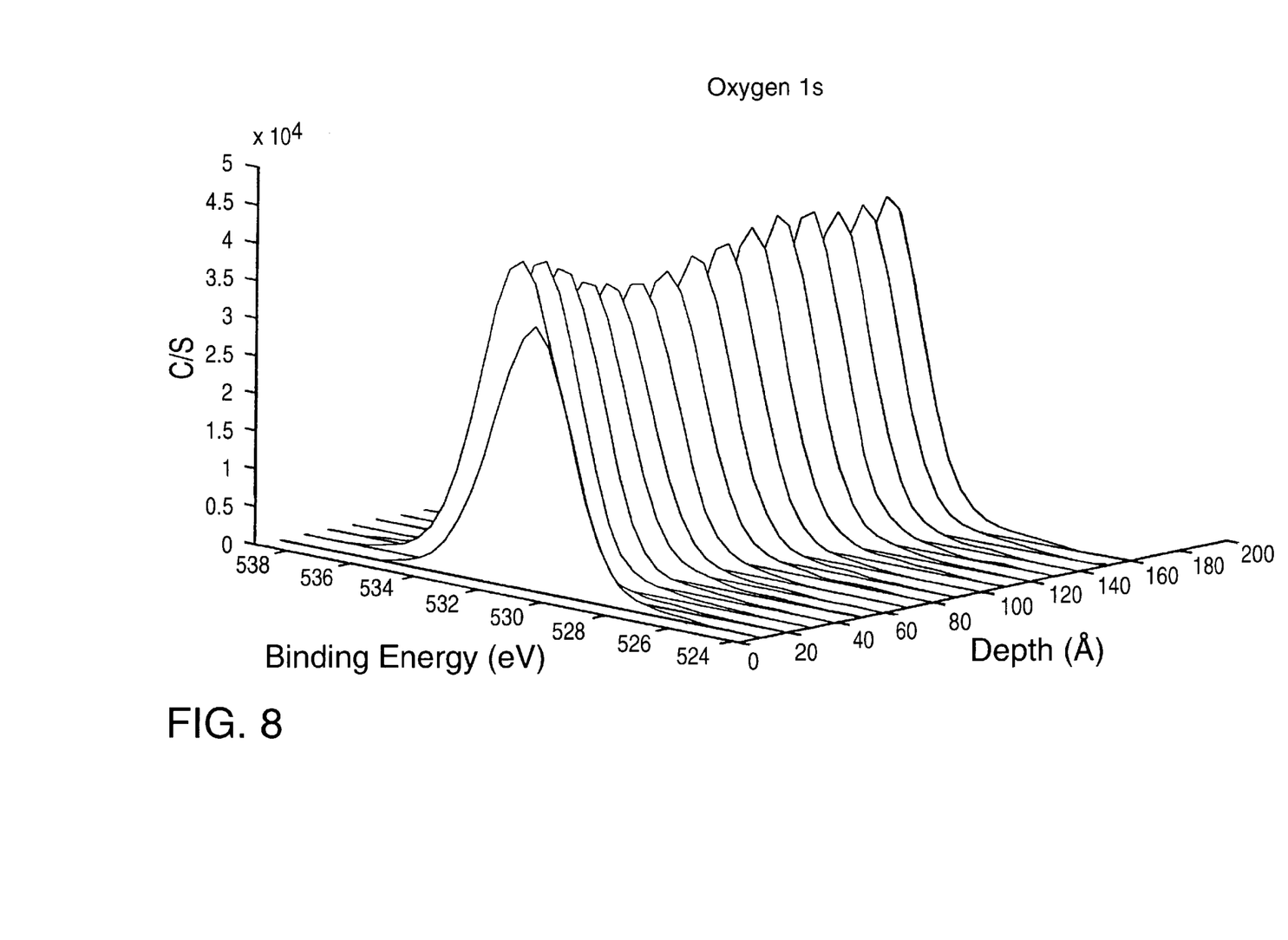
FIG. 8 is a montage plot of oxygen concentration versus binding energy as a function of depth within an AlTiC wafer ion implanted by the method of the present invention using a $SiF_4$ ion source, an ion dosage of $4 \times 10^{16}$ ions/cm$^2$, and an ion energy of 12.5 KeV.
Figure 9:
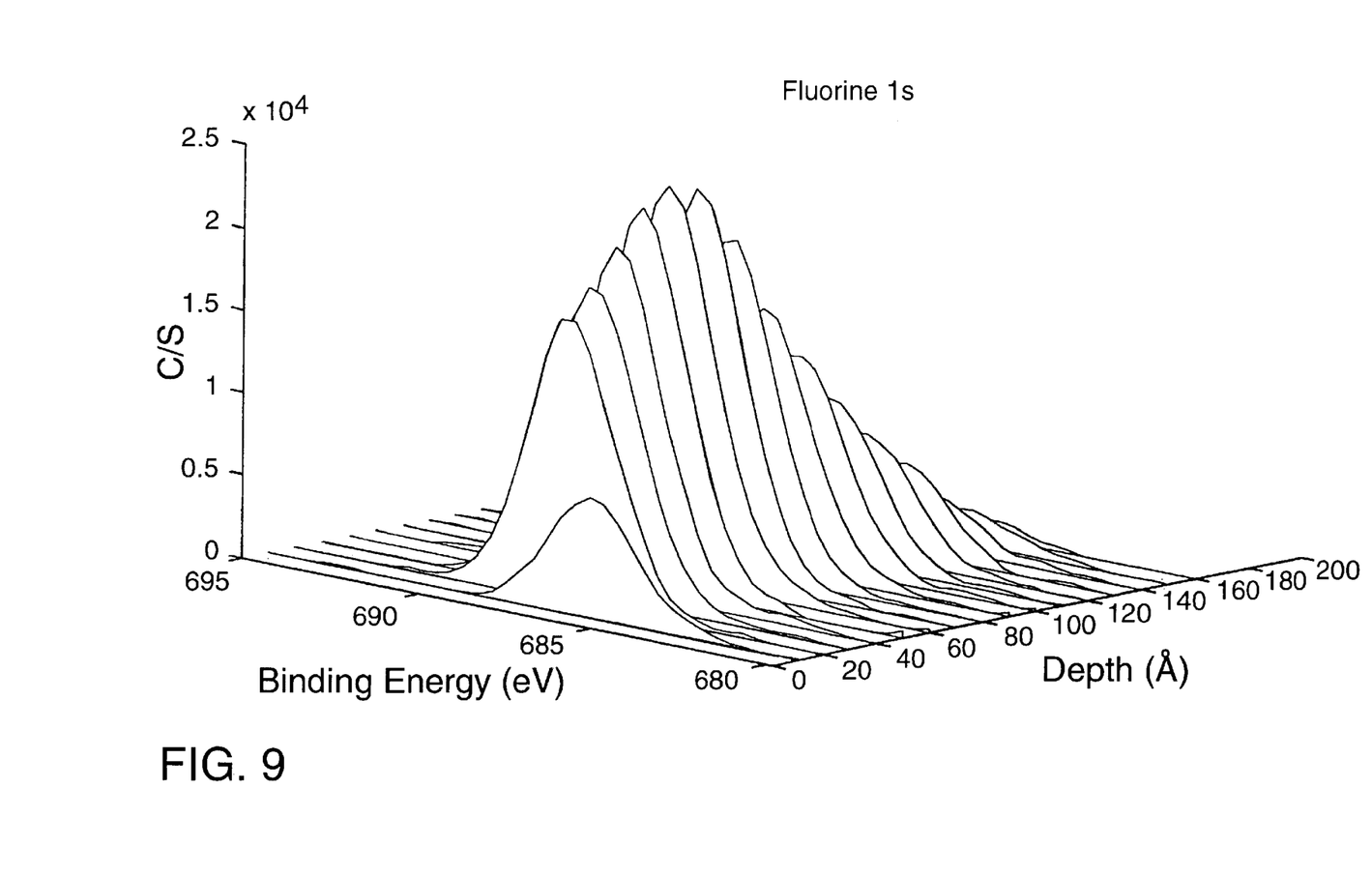
FIG. 9 is a montage plot of fluorine concentration versus binding energy as a function of depth within an AlTiC wafer ion implanted by the method of the present invention using a $SiF_4$ ion source, an ion dosage of $4 \times 10^{16}$ ions/cm$^2$, and an ion energy of 12.5 KeV.
Figure 10:
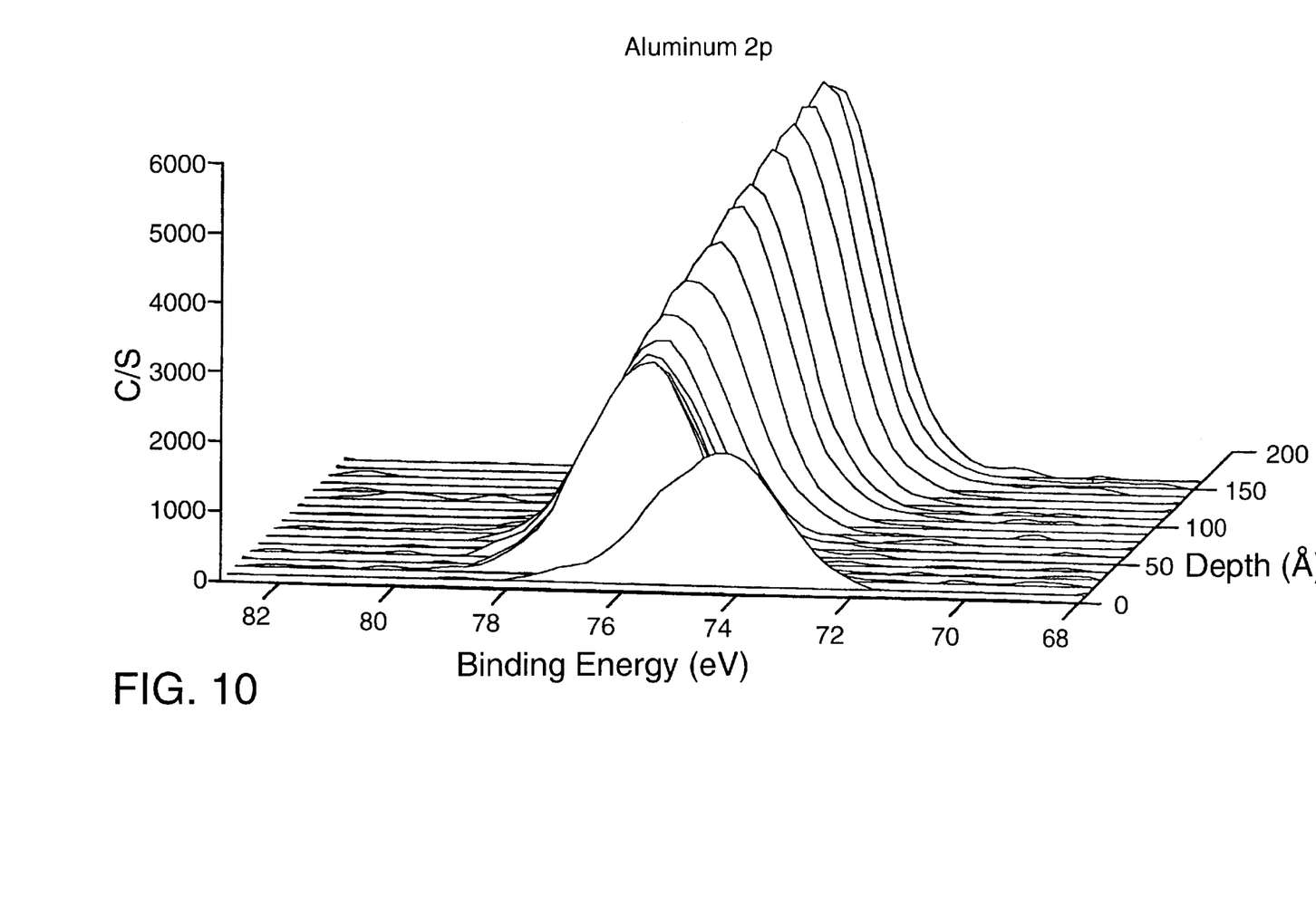
FIG. 10 is a montage plot of aluminum concentration versus binding energy as a function of depth within an AlTiC wafer ion implanted by the method of the present invention using a $SiF_4$ ion source, an ion dosage of $4 \times 10^{16}$ ions/cm$^2$, and an ion energy of 12.5 KeV.
Figure 11:
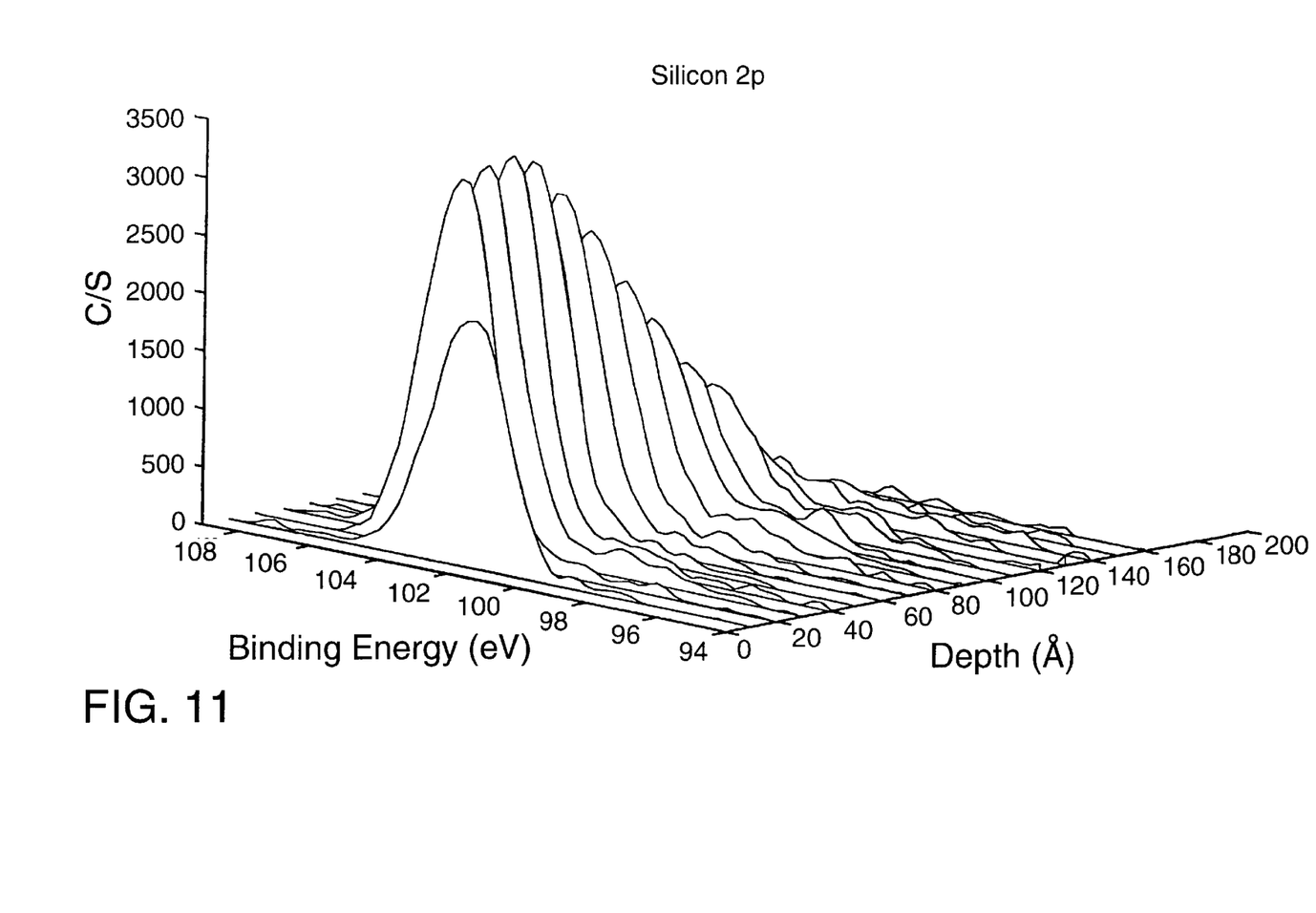
FIG. 11 is a montage plot of silicon concentration versus binding energy as a function of depth within an AlTiC wafer ion implanted by the method of the present invention using a $SiF_4$ ion source, an ion dosage of $4 \times 10^{16}$ ions/cm$^2$, and an ion energy of 12.5 KeV.
Figure 12:
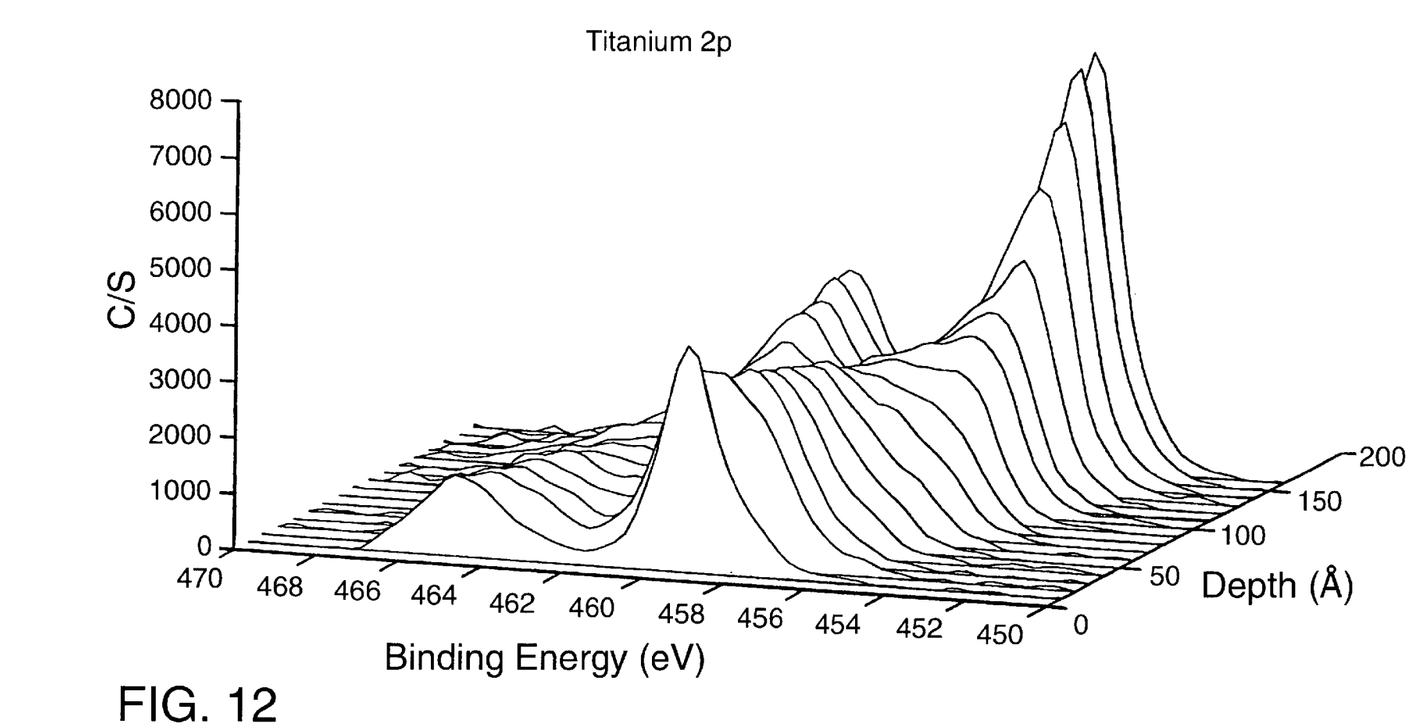
FIG. 12 is a montage plot of titanium concentration versus binding energy as a function of depth within an AlTiC wafer ion implanted by the method of the present invention using a $SiF_4$ ion source, an ion dosage of $4 \times 10^{16}$ ions/cm$^2$, and an ion energy of 12.5 KeV.

The SIMS technique also was applied to the untreated backside of the run 18 wafer to compare the composition of the treated surface and subsurface region of the wafer, shown in FIG. 4 , with untreated surface and subsurface regions of the wafer. FIG. 6 is a plot of secondary ion signals versus depth for the surface and subsurface region of the untreated, backside. The differences between FIGS. 4 and 6 are striking in that there is essentially no variation in secondary ion signals from the surface versus depth in the untreated backside.

The XPS/ESCA technique also was used to assess the composition and chemistry of treated GS-1 material of run 18 and run 19 wafer as a function of depth. Spectra were acquired using a Physical Electronics Quantum 2000 ESCA system having an X-ray source that may be focused to a spot size of approximately 10 μm. Survey spectra, high resolution spectra, montage plots, and depth plots were prepared and evaluated. Depth profiles were obtained by alternating an acquisition cycle with a sputter cycle during which material was removed from the treated wafer sample using 4 KeV $Ar^+$ ions. The elements carbon, oxygen, aluminum, titanium, fluorine, and silicon were tracked by the XPS/ESCA technique to a depth of approximately 170 Å. The elemental concentrations of those elements in the run 19 wafer as a function of sputter time/depth are shown in Table 2.

TABLE 2

| Sputter Etch Time (minutes) | Depth (Å) | Elemental Concentration (atomic %) | | | | | |
|---|---|---|---|---|---|---|---|
| | | C | O | F | Al | Si | Ti |
| 0 | 0 | 14 | 54 | 8.2 | 11 | 89 | 3.3 |
| 0.25 | 12.5 | 3.4 | 55 | 18 | 13 | 11 | 3.9 |
| 0.5 | 25 | 0.6 | 54 | 18 | 13 | 11 | 4.0 |
| 0.75 | 37.5 | 1.0 | 52 | 20 | 12 | 11 | 4.0 |
| 1 | 50 | 1.0 | 50 | 22 | 13 | 11 | 4.1 |
| 1.25 | 62.5 | 1.0 | 49 | 23 | 13 | 10 | 4.3 |
| 1.5 | 75 | 1.4 | 48 | 22 | 14 | 9 | 4.6 |
| 1.75 | 87.5 | 2 | 49 | 20 | 16 | 7.6 | 4.9 |
| 2 | 100 | 2.5 | 51 | 17 | 18 | 6.5 | 5.4 |
| 2.25 | 112.5 | 2.8 | 52 | 14 | 29 | 5.3 | 5.8 |
| 2.5 | 125 | 3.2 | 55 | 11 | 21 | 4.1 | 6.1 |
| 2.75 | 137.5 | 3.4 | 56 | 8.7 | 22 | 2.9 | 6.7 |
| 3 | 150 | 4.2 | 57 | 6.3 | 23 | 1.8 | 7.5 |
| 3.25 | 162.5 | 5.2 | 57 | 4.2 | 25 | 0.9 | 8.0 |
| 3.5 | 175 | 5.5 | 58 | 2.5 | 26 | 0.2 | 8.2 |
| 3.75 | 187.5 | 5.7 | 59 | 0.9 | 26 | 0 | 8.1 |

The montage plots for the run 19 wafer derived from the XPS/ESCA analysis showing the concentration profiles of each of carbon, oxygen, fluorine, aluminum, silicon, and titanium, respectively, are shown in FIGS. 7–12. The counts/second (c/s) value, shown on the y-axis of the montage plots, is proportional to the concentration of the element in each wafer region as it is removed by the $Ar^+$ ions. The binding energy, shown on the x-axis, provides an indication of the chemical state of the element in the analyzed region. The z-axis indicates the depth within the wafer. As will be readily understood by one of ordinary skill in the art, "1s" in FIGS. 7–9 indicates that signals from electrons in the 1s orbital of atoms of the detected element were used to prepare the plots of those figures, while "2p" in FIGS. 10–12 indicates that signals from electrons in 2p orbitals of atoms of the detected element were used to prepare the plots of FIGS. 10–12.

The XPS/ESCA analyses of the run 18 and run 19 wafers indicate that titanium is present in the subsurface region (approximately 100 Å depth) primarily as a titanium oxide complex $Al_xTi_yO_z$, and a lesser amount of $TiO_2$ and TiC/TiO also was detected. The titanium oxide complex ($Al_xTi_yO_z$) persisted into the depth of the samples, and after approximately 100 Å into the samples titanium was observed primarily as TiC/TiO. The analysis also revealed fluorine in the subsurface region of both samples, throughout the subsurface depth profile, in a form consistent with an inorganic fluoride. Silicon also was detected at the surface at a binding energy consistent with an intermediate oxide of the form $SiO_x$, where x is less than 2. That silicon form may act as an electrical insulator. Aluminum was consistent with a fluoride form (i.e., $AlF_3$) at the samples' surface and gradually transitioned into a form consistent with an aluminum oxide at depth. Varying amounts of an aluminum oxy-fluoride were present in the form $Al_xO_yF_z$ between the surface fluoride form ($AlF_3$) and the oxide form observed at the end of the depth profile. It is noted that aluminum fluoride is a very strong electrical insulator, and the aluminum oxy-fluoride also may have an electrical insulating effect. The form and amount of carbon detected in the two wafer samples was consistent with adventitious organic contamination (comprising hydrocarbons and oxygen functionalities of carbon). See, for example, the large initial carbon peak in FIG. 7. Beneath the surface, however, the carbon was detected as a carbide. The carbon profile data indicated that the carbide was depleted in the near surface region relative to the carbide concentration detected at depth. With respect to FIG. 7, carbon depletion is clearly shown in the subsurface region, beneath the surface carbon contamination. Silicon was found to be present in the subsurface region of the wafer samples in a form consistent with an oxide and was more similar to $SiO_2$ than the sub-oxide complex form suggested by the surface data. Both fluorine and silicon were found to persist to a depth of approximately 170 Å.

Based on the forgoing analytical results, it appears that ion implanting a GS-1 wafer with $SiF_3^+$ ions under the conditions of runs 18 and 19 creates a chemically modified subsurface region including an aluminum oxyfluoride complex ($Al_xO_yF_z$), a titanium oxide complex ($Al_xTi_yO_z$), and a silicon oxide/sub-oxide ($SiO_x$ where $x \leq 2$). The implantation also appears to deplete the TiC content within the subsurface region, which may contribute to the increased electrical resistivity of the wafer surface and subsurface region.

An investigation was undertaken to confirm that the enhanced electrical resistivity of wafers treated by the method of the invention is a result of the modified subsurface region produced by the ion implantation and/or plasma immersion techniques, and is not merely a result of silicon oxide ($SiO_2$) formed on the surface of the treated wafers. The treated surface of wafers ion implanted in run 18 and having a measured electrical resistivity of about $10^{11}$ ohm-cm were etched to a depth of approximately 100 Å. The etch removed any surface oxides and a portion of the modified region, beneath the wafer surface. The electrical resistivity of the etched treated surface was observed to decrease to about $10^7$ ohm-cm, which is about nine orders of magnitude greater than the 0.008 ohm-cm electrical resistivity of raw GS-1 material. Thus, the enhanced electrical resistivity provided by the present method does not solely result from surface oxides formed on the treated wafers.

The inventor also believes that the method of the present invention provides an additional advantage. The modified region formed by the present method has higher thermal conductivity relative to alumina undercoated AlTiC wafers. The recent development of magnetoresistive (MR) and giant magnetoresistive (GMR) heads with lower flying heights has significantly increased the a real density of magnetic media in disk drives. MR and GMR heads, however, suffer from the problem of thermal asperities, which are resistance transients generated by spikes in the temperature of the head's magnetoresistive stripe. A thermal spike is generated when the magnetoresistive stripe of the MR or GMR head contacts debris or a raised defect on the surface of the magnetic media. The thermal spike produces a corresponding resistance transient, generating a positive voltage transient (i.e., a thermal asperity signal) in the output of the head. Increasing the thermal conductivity of a region of the head by the method of the present invention may reduce the magnitude of any thermal spikes in the magnetoresistive stripe by more quickly dissipating heat away from the stripe.

Accordingly, the present invention provides an improved method for enhancing the electrical resistivity of a ceramic substrate or other article. Examples of application of the invention include the production of thin film magnetic recording heads and devices incorporating such heads. Although the present invention has been described in connection with certain embodiments, those of ordinary skill in the art will, upon considering the foregoing description, recognize that many modifications and variations of the invention may be employed. In particular, although the foregoing examples of the application of the method of the present invention utilize ion implantation to implant ions within the ceramic substrate, it is believed that plasma immersion, may be used with substantially the same results. All such variations and modifications of the present invention are intended to be covered by the foregoing description and the following claims.

I claim:

1. A magnetic recording head comprising:
    a substrate of a ceramic material, said substrate including an integral region having enhanced electrical resistivity relative to the remainder of said substrate; and
    a layer comprising at least one sensor element, said layer formed on said region of enhanced electrical resistivity.

2. The magnetic recording head of claim 1, wherein the electrical resistivity of said region is at least seven orders of magnitude greater than the electrical resistivity of said remainder of said substrate.

3. The magnetic recording head of claim 1, wherein said sensor element is a magnetic pole.

4. The magnetic recording head of claim 1, wherein the electrical resistivity of a surface of said region is at least as great as $10^5$ ohm-cm.

5. The magnetic recording head of claim 1, wherein said region has a thickness in the range of about 100 Å to about 1000 Å.

6. The magnetic recording head of claim 1, wherein said ceramic material comprises a carbide material.

7. The magnetic recording head of claim 6, wherein said ceramic material comprises at least one material selected from the group consisting of silicon carbide, titanium carbide, and boron carbide.

8. The magnetic recording head of claim 7, wherein said ceramic material comprises alumina and titanium carbide.

9. The magnetic recording head of claim 8, wherein said ceramic material comprises about 60% to about 80% by weight alumina and about 20% to about 40% by weight titanium carbide.

10. The magnetic recording head of claim 8, wherein said region of enhanced electrical resistivity is depleted in titanium carbide as compared to the remainder of said substrate.

11. The magnetic recording head of claim 10, wherein said region of enhanced electrical resistivity comprises at least one of $SiO_x$ where $x \leq 2$, aluminum oxy-fluoride complex, titanium oxide complex, and $AlF_3$.

12. The magnetic recording head of claim 1, wherein said region of enhanced electrical resistivity is formed by impinging ions on said substrate.

13. The magnetic recording head of claim 12, wherein said ions are derived from at least one source selected from the group consisting of helium, neon, argon, krypton, xenon, nitrogen, oxygen, fluorine, chlorine, bromine, iodine, halogen compounds, silicon, and antimony.

14. A magnetic memory device including a magnetic recording head comprising:

a substrate of a ceramic material, said substrate including an integral region having enhanced electrical resistivity relative to the remainder of said substrate; and a layer formed on at least a portion of said region of enhanced electrical resistivity, said layer comprising at least one magnetic pole.

15. The magnetic memory device of claim 14, wherein the electrical resistivity of said region is at least seven orders of magnitude greater than the electrical resistivity of said remainder of said substrate.

16. The magnetic memory device of claim 15, wherein said region having enhanced electrical resistivity is formed by bombarding said substrate with ions.

17. The magnetic memory device of claim 15, further comprising a magnetic recording medium, said magnetic recording head performing at least one of reading of and writing to said magnetic recording medium.

18. An electronic device comprising a magnetic memory device, the magnetic memory device including a magnetic recording head comprising:

a substrate of a ceramic material, said substrate including an integral region having substantially enhanced electrical resistivity relative to the remainder of said substrate; and a layer formed on at least a portion of said region of enhanced electrical resistivity, said layer comprising at least one magnetic pole.

* * * * *